UNITED STATES PATENT OFFICE.

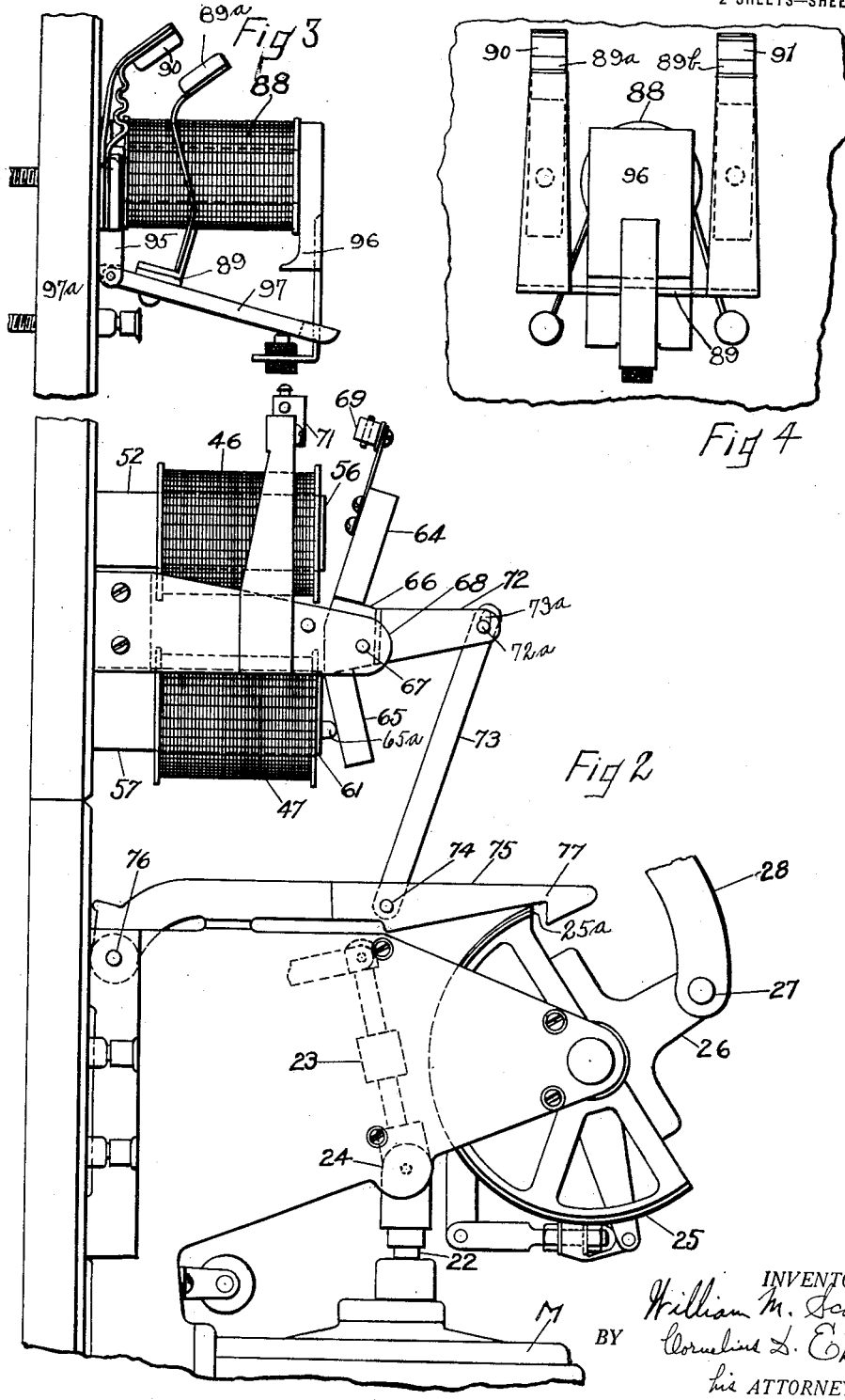

WILLIAM M. SCOTT, OF TREDYFFRIN TOWNSHIP, CHESTER COUNTY, PENNSYLVANIA.

SWITCHING APPARATUS.

1,340,918.   Specification of Letters Patent.   Patented May 25, 1920.

Application filed November 26, 1919. Serial No. 340,725.

*To all whom it may concern:*

Be it known that I, WILLIAM M. SCOTT, a citizen of the United States, residing in Tredyffrin township, in the county of Chester and State of Pennsylvania, have invented a new and useful Switching Apparatus, of which the following is a specification.

My invention relates to motor operated electric switches or circuit breakers, and particularly to the motor control circuits.

My invention resides in apparatus of the character referred to wherein switch or circuit breaker mechanism is operated or actuated by an electric motor controlled primarily by an operator's switch which is deprived by a localizing switch of control of the motor once control of the motor has been instituted by the operator's switch, together with additional switching means, as electro-magnetic switching means or a relay, which co-acts jointly with the localizing switch in robbing the operator's switch of control of the motor.

My invention resides in apparatus of the character hereinafter described and claimed.

For an illustration of one of the various forms my invention may take, reference is to be had to the accompanying drawings, in which:

Fig. 2 is a side elevational view of switch or circuit breaker actuating mechanism and controlling means therefor.

Fig. 3 is a side elevational view of one form my relay structure may take.

Fig. 4 is a front elevational view of the same.

Figure 1:
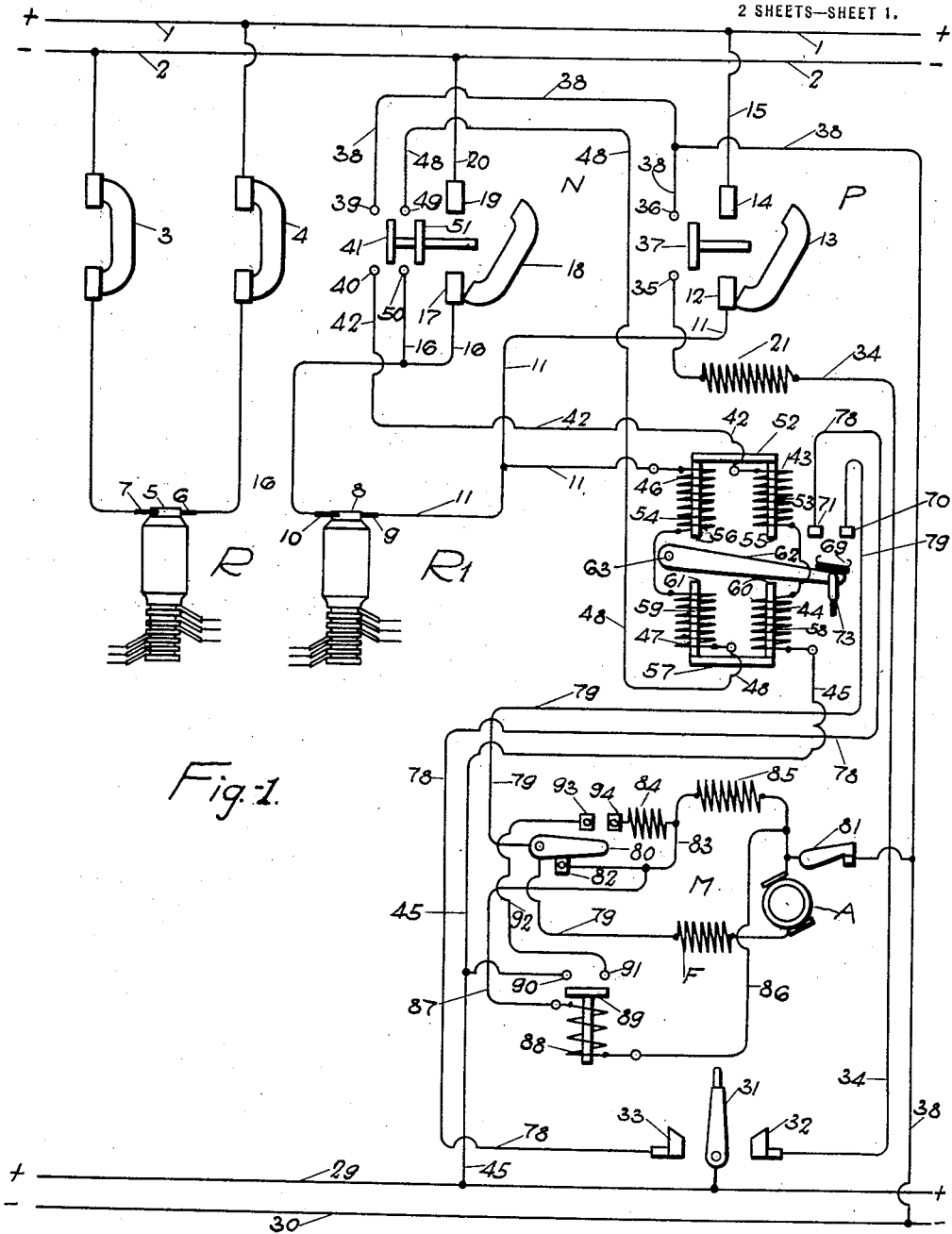
Figure 1 is a diagrammatic view illustrating switching mechanism embodying my invention and circuit arrangements with which it may be employed.

Referring to Fig. 1, 1 and 2 are, respectively, the positive and negative conductors of a circuit energized through the switches 3 and 4 by any suitable source of current, this source, in the example illustrated, being a rotary converter R of which only the armature is illustrated, said armature having the direct current commutator 5 and the positive and negative brushes 6 and 7.

A second source of current to be connected with the conductors 1 and 2 is in the example illustrated a second rotary converter $R^1$ whose armature only is illustrated, said armature having the direct current commutator 8 and the brushes 9 and 10, which may be, respectively, positive and negative or negative and positive, depending with which half cycle of alternating current the armature falls in step, it being well known that a given terminal of the direct current side of an armature of a rotary converter may be either positive or negative. But it being essential that the positive terminal shall be connected to the positive conductor 1, automatic apparatus is provided to prevent connection of the rotary converter $R^1$ to the conductors 1 and 2 unless the brush 9 is positive.

A conductor 11 connects the brush 9 with one terminal 12 of a switch or automatic circuit breaker P comprising the movable contact member 13 adapted to bridge the terminals 12 and 14, the terminal 14 being connected by a conductor 15 with the conductor 1. A conductor 16 connects the brush 10 with the terminal 17 of a switch or circuit breaker N comprising the movable contact member 18 adapted to bridge the terminals 17 and 19, the terminal 19 being connected by conductor 20 with the negative conductor 2. The switch or circuit breaker P may be termed the positive switch or breaker, while the switch or breaker N may be considered the negative switch or breaker. These switches or circuit breakers P, N are of any suitable or well known structure which may be latched in circuit closing position, the latching mechanism of both being actuated upon energization of the tripping coil 21 to cause both switches or breakers to open.

The switch or breaker N is preferably operated by hand to close and latch it, while the switch or breaker P is actuated to circuit closing position by a motive device as an electric motor M comprising the armature A and the series field winding F, the armature A having the shaft 22, Fig. 4, which drives the worm 23, connected to the shaft 22 by universal joint 24. The worm 23 is adapted to mesh with and drive the gear segment 25 having the crank 26, to which is pivoted at 27 the pitman or connecting rod 28 connected to the mechanism for actuating the movable contact member 13 of switch or breaker P, as, for example, disclosed in my prior Patent No. 1,108,254, August 25, 1914.

The conductors 29 and 30, Fig. 1, are those of a direct current control circuit connected to an independent source of energy, or said conductors may be connected, respectively, with the positive and negative conductors 1 and 2. Connected with the conductor 29 is the operator's switch 31 adapted to engage either of the contacts 32 or 33. Contact 32 is connected by conductor 34 to one terminal of the trip coil 21 whose other terminal is connected to the contact 35 adapted to be connected to the terminal 36 by the bridging member 37, which separates from the contacts 35 and 36 when the contact member 13 moves to open circuit position and which engages such contacts when the contact member 13 is moved to circuit closing position. The contact 36 connects by conductor 38 to the negative conductor 30 of the control circuit.

The conductor 38 connects also with the contact 39, with which is associated the contact 40, the bridging member 41 adapted to bridge these contacts when the movable contact member 18 is in circuit closing position and to separate from them when contact member 18 moves to open circuit position. The contact 40 is connected by conductor 42 with one terminal of the serially connected magnet windings 43 and 44, whose other terminal is connected by conductor 45 to the control circuit conductor 29.

The conductor 11, connected to the brush 9 of rotary converter $R^1$, connects with one terminal of the serially connected magnet windings 46 and 47, whose other terminal connects by conductor 48 with the switch contact 49, with which is associated the switch contact 50 connected by conductor 16 with the brush 10 of the rotary converter $R^1$. The bridging member 51 engages contacts 49 and 50 when the contact member 18 is in circuit closing position, and separates from them when member 18 moves to open circuit position.

Magnet windings 43 and 44 may be connected in parallel with each other in lieu of in series; and likewise windings 46 and 47 may be connected in parallel with each other.

The magnet windings 43 and 46 have a common magnetic circuit comprising the yoke 52 and the cores 53 and 54, having, respectively, the poles 55 and 56. The magnet windings 44 and 47 have a common magnetic circuit comprising the yoke 57 and the cores 58 and 59 having, respectively, the poles 60 and 61, the two magnetic circuits described being magnetically independent of each other.

In Fig. 1 an armature structure coöperating with the aforesaid magnetic circuits is indicated as a member 62 pivoted at 63. The armature structure in Figs. 2, 3 and 4 comprises an armature 64 and an armature 65, preferably but not necessarily magnetically independent of each other and secured to the non-magnetic member 66 pivoted at 67, 67 in a frame 68, the armature 64 coöperating with poles 55 and 56 and armature 65 coöperating with poles 60 and 61 but prevented from reaching them by non-magnetic stop 65$^a$. Carried by the armature structure is a contact 69 adapted to bridge the contacts 70 and 71. Secured to the armature structure is a bracket 72 carrying pin 72$^a$ extending through slot 73$^a$ in rod 73, whereby suitable lost motion is allowed. The rod 73 is pivoted at its lower end at 74 to latch member 75 pivoted to the base at 76 and having the latch hook 77 extending into the path of travel of the abutment 25$^a$ on the gear segment 25 to lock or restrain gear 25 to prevent actuation of breaker P either by hand or by motor M.

The contact 33 of the operator's switch is connected by conductor 78 with the contact 71, and contact 70 is connected by conductor 79 to the movable switch lever 80 and to one terminal of the motor field F whose other terminal connects with the motor armature A, whose other terminal connects through the closed motor control switch 81 through conductor 38 to the control circuit conductor 30. The switch lever 80 is in engagement with the contact 82, which connects by conductor 83 with one terminal of the resistance 84 and one terminal of the magnet coil 85 whose other terminal connects with the switch 81, the coil 85 when energized serving to move the worm 23, Fig. 4, into mesh with the gear segment 25, as well understood in the art. Connected to the switch 81 and switch contact 82 by conductors 86 and 87 is the relay coil 88, which when energized raises its armature and brings the contact 89 into engagement with the contacts 90 and 91, of which the former is connected through conductor 45 with the control circuit conductor 29 and of which the latter is connected by conductor 92 with the switch contact 93 which, with contact 94 connected to the remaining terminal of the resistance 84, is adapted to be engaged by the localizing switch lever 80.

The relay 88 may partake of any suitable structure, an example of which is illustrated in Figs. 3 and 4, wherein the relay winding is indicated at 88, associated with the magnetizable pole pieces 95, 96, with which coacts the armature 97 carrying the bridging contact structure 89 comprising the interconnected movable contact members 89$^a$ and 89$^b$ adapted to engage and bring into electrical communication with each other the stationary relay contacts 90 and 91 when current traverses the coil 88 and the armature 97 is attracted upwardly upon its pivot 97$^a$, as viewed in Fig. 3.

The operation is as follows:

If the terminals 9 and 10 of the source of current, as rotary converter $R^1$, are of proper polarity, that is, terminal 9 positive and terminal 10 negative, the source R¹ may be connected to the conductors 1 and 2 as follows:

First the negative breaker N is closed as by hand, in which case the terminals 17 and 19 are bridged by the contact 18, contacts 39 and 40 are connected by bridge 41 and contacts 49 and 50 are bridged by contact 51. Accordingly current flows from the positive terminal 9 through conductor 11, the magnet windings 46 and 47, conductor 48, switch 49, 50, conductor 16, to negative terminal 10, thereby energizing coils 46 and 47, which cause the poles 56 and 61 to be, for example, north and south poles, respectively. Simultaneously current flows from the positive control conductor 29 through conductor 45, magnet windings 44 and 43, conductor 42, switch 39, 40, conductor 38 to the negative control 30, thereby energizing coils 44 and 43, whose poles 55 and 60 are both south poles. Accordingly the magnet windings 43 and 46 operate cumulatively upon their magnetic circuit to produce a powerful attraction upon their armature 64; simultaneously, however, the magnet windings 44 and 47 oppose each other as to their magnetic circuit so that they exert little or no attraction upon the armature 65. Accordingly the armature 64 is attracted, the armature structure moving in a counterclockwise direction, as viewed in Fig. 4, causing the contact 69 to bridge contacts 70 and 71 and simultaneously lifting the hook latch 77 to allow extended movement of the gear segment 25.

The operator may now throw the switch 31 into engagement with contact 33, whereupon current will flow from the positive control conductor 29 through the operator's switch, contacts 71, 70, conductor 79, field F and armature A of the motor M, also through switch blade 80, contact 82, engaging coil 85, both currents uniting and passing through switch 81 to the negative supply circuit conductor 30. This energizes the motor, which starts to rotate and also energizes the engaging coil 85, which, in the manner well understood in the art, shifts the worm 23 into engagement with gear segment 25 which is then rotated by the motor armature and pulls downwardly upon the rod 28, which starts to close the switch or breaker P.

In addition to shifting the worm 23 into mesh with gear 25, the engaging coil, by structure well known in the art, shifts the localizing switch 80 from contact 82 into engagement with contacts 93 and 94 before eventually breaking contact with the contact 82. Simultaneously with energization of the engaging coil 85 the relay coil 88 is energized, bringing the contact 89 into engagement with contacts 90 and 91, so that when the localizing switch 80 engages contacts 93 and 94, the operator's switch 31 is robbed of control of the motor M, which continues to run until the contact member 13 is moved to circuit closing position, whereupon the motor switch 81 is opened as well understood in the art, with resultant deënergization of the motor, the engaging coil 85 and the relay 88. The motor switch 81, by mechanism well understood in the art, remains open until the breaker P is tripped as by energizing coil 21 by throwing switch 31 into engagement with contact 32; the switch 81 is closed as breaker P opens, and is then in readiness for subsequent operation of the motor M.

The relay 88 is provided to prevent improper or untimely energization of the motor M by manually shifting the localizing switch 80 into engagement with contacts 93 and 94; the contact 93 ordinarily heretofore being connected directly to the conductor 45. The relay contacts 90 and 91 with their bridging contact 89 constitute a switch in series with the localizing switch 80, whereby the localizing action cannot take place until the relay 88 bridges contacts 90 and 91 and switch 80 engages contact 93. The localizing action effected by the joint action of switch 80 and relay 88 is to rob both the operator's switch 31 and the switch 69, actuated by the polarity responsive electromagnetic means, of control of the motor M, whereby when once the operator's switch 31 has been closed with contact 33 and switch 69 has been closed when polarity conditions are correct the motor M is started in its closing movement of the main switch or breaker mechanism, as P, and cannot thereafter be stopped, short of complete switch or breaker closure, by opening either the switch 69 or the operator's switch 31. Thus two motor controlling switches 31 and 69 in series with each other are robbed of control by the conjoint action of relay 88 and localizing switch 80. The relay 88 is preferably located at such distance from the switch 80 that a person cannot simultaneously reach or actuate both; the relay 88 is generally placed on the rear of the motor panel of the switchboard, while the switch 80 is on the front thereof. By this arrangement the motor M cannot be energized, so long as the switch 31 is open, either by moving the switch 80 into engagement with contacts 93 and 94, or by raising the contact 89 of the relay 88 into engagement with contacts 90 and 91.

The foregoing operation is the normal one when the terminal 9 of the source R¹ is properly positive or of proper polarity with respect to the conductor 1 or conductor 29. If, however, the source of current, as rotary R¹, has its polarity reversed so that its terminal 9 is negative instead of positive, as frequently occurs in the case of a rotary converter, the breaker N may be manually closed, but it will be impossible to move the breaker P to circuit closing position by the motor M or by hand. This is due to the fact that the direction of current through the coils 46 and 47 will be reversed, due to reversal of polarity of the source R¹, and the poles 56 and 61 will be in such case south and north poles, respectively, or generally speaking, reversed. The coils 46 and 43 in such case oppose each other as to their common magnetic circuit, and there is little or no attraction exerted upon the armature 64; on the other hand, the coils 44 and 47 now operate cumulatively upon their magnetic circuit and exert an attraction upon the armature 65 which prevents movement of the armature structure to bridge contacts 70 and 71 or to lift the latch 77. So long as the contacts 70 and 71 are not bridged by contact 69, movement of operator's switch 31 into engagement with contact 33 will be powerless to energize the motor and cause closure of the breaker P, and therefore one terminal of the source R¹ is prevented from communication with the conductor 1. It will then be necessary to reverse the polarity of the source R¹, and when this is a rotary converter, its reversal of polarity is accomplished in well known manner, as, for example, causing its armature to fall back a half cycle, whereupon the polarity will be proper for connection with the circuit 1, 2, the coils 46 and 47 being now traversed by current in proper direction to effect bridging of contacts 70 and 71 and release of latch 77, which latter, when in its lower position, prevents closure of the switch or circuit breaker P either by hand or by motor M.

This application is a continuation in part of my prior application Ser. No. 232,695, filed May 6, 1918.

What I claim is:

1. The combination with an electric switch, of a motor for actuating the same, a switch controlling said motor, a localizing switch controlled by said motor control switch for robbing said motor control switch of control of said motor, and a relay controlled by said motor control switch controlling the circuit controlled by said localizing switch.

2. The combination with an electric switch, of a motor for actuating the same, a switch controlling said motor, a localizing switch having two positions in one of which it is controlled by said motor control switch and in a second of which it controls said motor independently of said motor control switch, and a relay whose winding is energized through said localizing switch in both its positions, the contacts controlled by said relay being connected in circuit with said localizing switch in its second position.

3. The combination with an electric switch, of a motor for actuating the same, a switch controlling said motor, a localizing switch having two positions in one of which it is controlled by said motor control switch and in a second of which it controls said motor independently of said motor control switch, and a relay energized through said circuit of said localizing switch in its second position.

4. The combination with an electric switch, of a motor for actuating the same, a switch controlling said motor, a localizing switch having two positions in one of which it is controlled by said motor control switch and in a second of which it controls said motor independently of said motor control switch, a relay energized through said motor control switch, the relay contacts controlling the circuit of said localizing switch in its second position, and connections whereby said relay remains energized through said localizing switch in its second position independently of said motor control switch.

5. The combination with an electric switch, of a motor for actuating the same, a switch controlling said motor, a localizing switch controlled by said motor control switch for robbing said motor control switch of control of said motor, and a relay whose winding is controlled by said motor control switch and whose controlled contacts are in series with said localizing switch.

6. The combination with an electric switch, of a motor for actuating the same, a switch controlling said motor, a localizing switch controlled by said motor control switch for robbing said motor control switch of control of said motor, and a relay whose winding is first controlled by said motor control switch and thereafter by said localizing switch, the contacts of said relay connected in series with said localizing switch.

7. The combination with an electric switch, of a motor for actuating the same, manually and electro-magnetically controlled switches jointly controlling said motor, and a localizing switch controlled jointly by said manually and electro-magnetically operable switches for robbing said switches of control of said motor.

8. The combination with an electric switch, of a motor for actuating the same, manually and electro-magnetically controlled switches jointly controlling said motor, a localizing switch controlled jointly by said manually and electro-magnetically operable switches for robbing said switches of control of said motor, and a relay controlled by said manually and electro-magnetically operable switches controlling the circuit controlled by said localizing switch.

9. The combination with an electric switch, of a motor for actuating the same, a switch controlling said motor, an engaging coil controlling operative connection between said motor and the switch actuated thereby, said motor control switch controlling said engaging coil, a relay having a winding controlled jointly with said engaging coil by said motor control switch, a localizing switch robbing said motor control switch of control of said motor and actuated by said engaging coil, and the contacts of said relay controlling the circuit controlled by said localizing switch after actuation by said engaging coil.

10. The combination with an electric switch, of a motor for actuating the same, a switch controlling said motor, an engaging coil controlling operative connection between said motor and the switch actuated thereby, said motor control switch controlling said engaging coil, a relay having a winding controlled jointly with said engaging coil by said motor control switch, a localizing switch robbing said motor control switch of control of said motor and actuated by said engaging coil, and the contacts of said relay controlling the circuit controlled by said localizing switch after actuation by said engaging coil, said engaging coil and relay winding controlled by said localizing switch in both its positions.

In testimony whereof I have hereunto affixed my signature this 24th day of November, 1919.

WILLIAM M. SCOTT.